United States Patent [19]

Miller

[11] 4,397,484

[45] Aug. 9, 1983

[54] LOCKING COUPLING SYSTEM

[75] Inventor: Henry W. Miller, Dallas, Tex.

[73] Assignee: Mobil Oil Corporation, New York, N.Y.

[21] Appl. No.: 369,329

[22] Filed: Apr. 16, 1982

[51] Int. Cl.³ .............................................. F16L 15/00
[52] U.S. Cl. ..................................... 285/81; 285/175; 285/333; 285/DIG. 14; 29/526 R
[58] Field of Search .................. 285/81, 92, 175, 333, 285/334, DIG. 14; 29/526 R

[56] References Cited

U.S. PATENT DOCUMENTS

| 861,828 | 7/1907 | Grindrod et al. ................... 285/175 |
| 1,583,126 | 5/1926 | Crane ................................... 285/175 |
| 1,781,091 | 11/1930 | Wilson ............................. 285/333 X |
| 2,204,392 | 6/1940 | Arm ................................... 285/81 X |
| 2,913,261 | 11/1959 | Matchett ............................. 285/175 |
| 3,015,500 | 1/1962 | Barnett .............................. 285/81 X |
| 3,463,228 | 8/1969 | Hearn ............................. 285/175 X |
| 3,519,290 | 7/1970 | Dunlap et al. ........................ 285/81 |
| 3,762,745 | 10/1973 | Cunningham ........................ 285/92 |

FOREIGN PATENT DOCUMENTS 26012 of 1913 United Kingdom ................. 285/81

*Primary Examiner*—Thomas F. Callaghan
*Attorney, Agent, or Firm*—Charles A. Huggett; Michael C. Gilman; Frank J. Kowalski

[57] ABSTRACT

An apparatus is disclosed wherein oppositely threaded, dissimilar coarseners threads are provided to receive couplings having tapered splined ends.

5 Claims, 2 Drawing Figures

LOCKING COUPLING SYSTEM

BACKGROUND OF THE INVENTION

In many applications, the cost of maintenance man hours has created a need for maintenance free devices. This is particularly true of subsea devices which lie many hundreds or thousands of feet below the surface of the ocean.

In subsea oil production, when a cluster of wells have been drilled and completed, a vertical conduit or plurality of flowlines must be connected between the wells and the surface facility for processing the oil and gas before transporting to a refinery.

In many instances the surface facility is a floating vessel requiring the flow-line bundle end terminations to be flexibly connected at the surface.

Normally, this requires several pipes in a flowline bundle, each pipe must be a continuous conduit from the surface to the seafloor. The connections between these pipes must be made easily and solidly. Normally, the sections of flowline pipes have been joined by screwing clockwise each pipe into a coupling. Rotation of the coupling in a counter clockwise direction could result from dynamic motions and thermal variations. One means of preventing this occurance is to weld the coupling and pipe with a steel strip member. Another means would be to apply an epoxy adhesive to the pipe threads. Both of these methods are time consuming when joining or breaking out the connections.

SUMMARY OF THE INVENTION

The present invention pertains to coupling systems for locking two pipe joints together and more particularly to pipe joints used in locations where maintenance and repair are extremely difficult such as subsurface marine locations. The present invention comprises a coupling which includes two coupling halves each having spleened ends adapted to lock into each other. One coupling half screws onto a threaded pipe member having a predetermined pitch and rotational direction, either left hand or right hand thread. A second coupling half screws onto a second pipe member having the same rotational direction, either right hand or left hand threads but a significantly different pitch. The two coupling halves are rotated in opposite directions until their spleened ends coincide. The coupling spleen ends are engaged by rotating the coupling halves simultaneously counter clockwise. The courser threaded coupling half will advance on the common axis at a greater rate than the finer thread coupling. After several turns the coupling halves engage the tapered spleen ends and further torqueing of the coupling in the counter clockwise direction engages the coupling tighter.

DESCRIPTION OF THE PREFERRED EMBODIMENT

Figure 1:
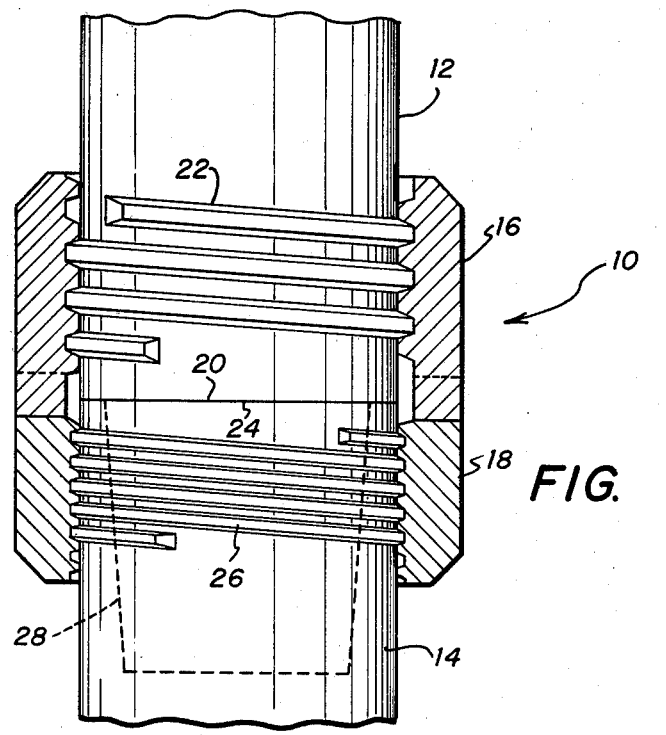
FIG. 1 is a partially cut away plan view of a locking coupling system.

FIG. 1 illustrates locking coupling system 10 as having male pipe member 12 and female pipe member 14 held together by coupling half 16 and coupling half 18 affixed to pipe members 12 and 14 respectively. Pipe member 12 has pipe end 20 and threads 22 thereon. Pipe member 14 has end 24 and threads 26 thereon.

In operation, coupling half 16 is screwed on pipe member 12 and backed off away from end 20. Coupling half 18 is screwed on pipe member 14 and backed off from end 24. Pipe member 12 is screwed into pipe member 14 as illustrated at 28. Coupling half 16 is rotated counter clockwise to advance towards pipe end 20. Coupling half 18 is rotated clockwise to advance towards pipe end 24.

Threads 22 of pipe member 12 are left hand threads having a very course pitch such as $\frac{1}{2}$ P. Threads 26 of pipe member 14 have a much finer left hand thread such as $\frac{1}{4}$ P. Pipe member 12 and pipe member 14 may have threads of any pitch and profile, however, they preferably have right hand threads. Threads 22 and 26 may be either left hand threads or right hand threads with the only requirement being that they are both either right hand or left hand threads and are opposite the threads of pipe members 12 and 14.

Figure 2:
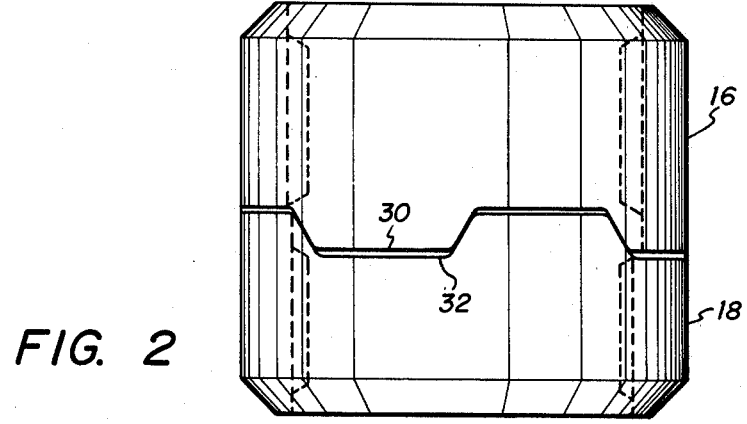
FIG. 2 is a plan view of the coupling halves of FIG. 1.

Referring now to FIG. 2, coupling halves 16 and 18 are illustrated as having spleened ends 30 and 32 which are adapted to mesh with each other. Spleened ends 30 and 32 may be of any dimensions as long as they fit snugly when coupling halves 16 and 18 are abutted against each other. In operation, coupling half 16 is rotated counter clockwise and coupling half 18 is rotated clockwise until spleened ends 30 and 32 engage. Coupling halves 16 and 18 must be rotated in unison either clockwise or counter clockwise once spleened ends 30 and 32 engage. Rotation of coupling halves 16 and 18 in a counter clockwise direction engages spleened ends 30 and 32 tighter. Coupling half 16 advances along pipe member 12 toward pipe end 20 at a faster rate than coupling half 18 withdraws along pipe member 14 from pipe end 24 when rotated in a counter clockwise direction. Due to the coarser pitch of threads 22 than the pitch of threads 26. Further rotation of coupling halves 16 and 18 tighten coupling half 18 on pipe member 14 to a greater degree than coupling half 16 on pipe member 12.

Due to the threading arrangement, that is, pipe members 12 and 14 having opposite direction threads of coupling halves 16 and 18, the coupling system 10 is locked in position. Rotation in one direction serves to tighten pipe member 12 into pipe member 14 while rotation in the opposite direction serves to tighten coupling half 16 on coupling half 18.

While the present invention has been illustrated by way of preferred embodiment, it is to be understood that it is not limited thereto but only by the scope of the following claims.

What is claimed is:

1. A system for joining two pipe ends comprising:
 a first pipe having an internally and externally threaded end, said external threads having a predetermined pitch;
 a second pipe having an externally threaded end with two sets of external threads, one set of said external threads for matching said internal threads of said first pipe and an other set of external threads spaced behind one set of threads having a different pitch from said predetermined pitch of said external threads of said first pipe and threaded in a direction opposite from said one set of external threads; and
 coupling means having two sections, one section having threads matching said external threads on said first pipe and an other section having threads matching said other set of threads on said second pipe for locking said first and said second pipe together.

2. The system according to claim 1 wherein said end of said second pipe has a smaller diameter for said first set of external threads than for said second set of external threads.

3. The system according to claim 2 wherein said coupling halves have spleened ends for interlocking said one section with said other section.

4. A method for joining two pipe ends, a first pipe end having its outermost section with external threads which screws into an internally threaded second pipe end comprising:

providing threads on said first pipe end and said second pipe end wherein said threads run in the same direction and having different pitches;

providing coupling halves with matching threads for each of said first pipe end and said second pipe end;

screwing said coupling halves in opposite directions to approach one another; and rotating said coupling halves in the same direction when said coupling halves touch.

5. The method according to claim 4 also including the steps of:

providing spleened ends on said coupling halves;

rotating said coupling halves until said spleened ends are in line; and rotating said coupling halves in the same direction until said spleen halves interlock with one another.

* * * * *